Aug. 28, 1923.
P. HAZZARD
BEATER
Filed Sept. 1, 1922
1,465,940
2 Sheets-Sheet 2
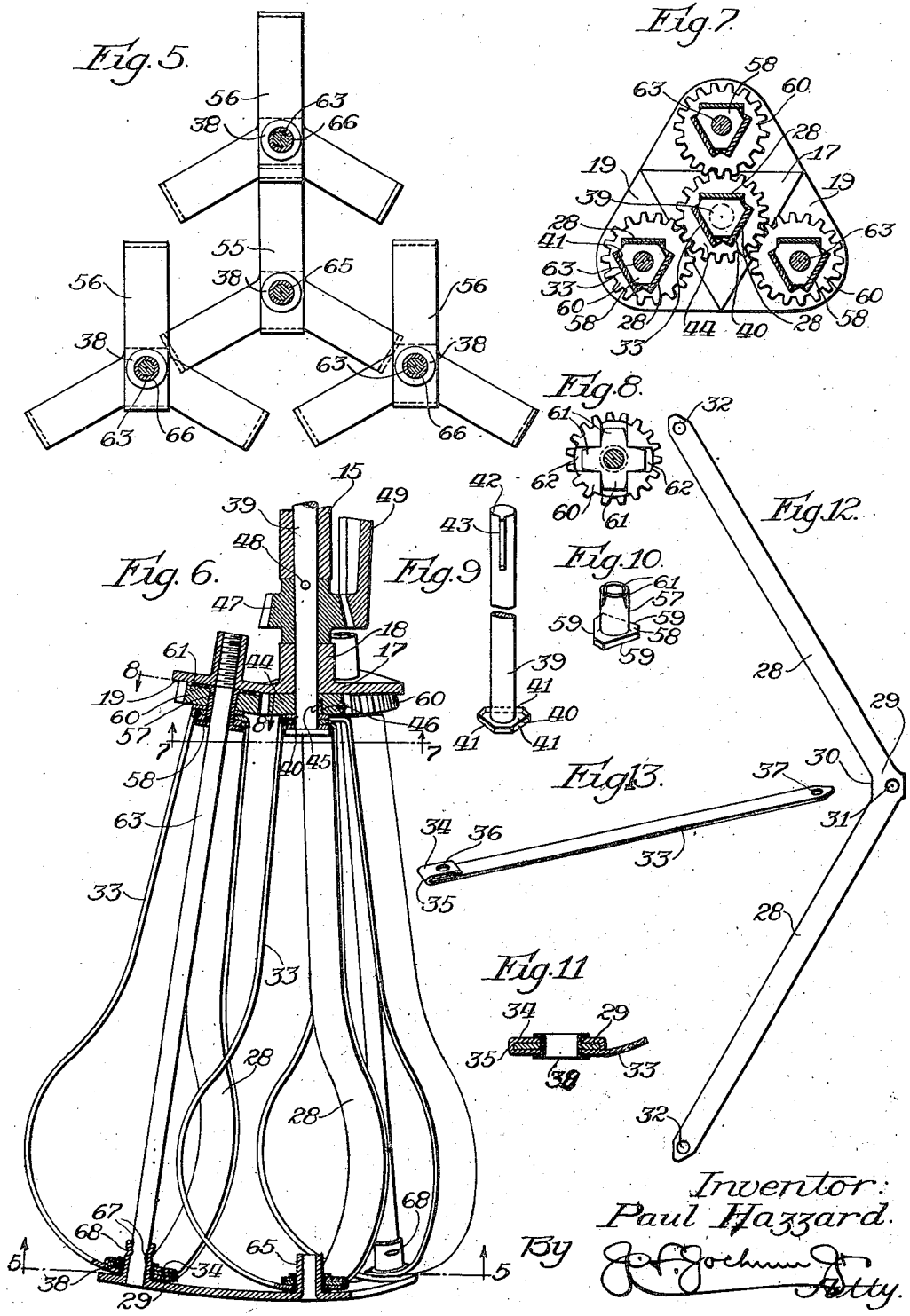

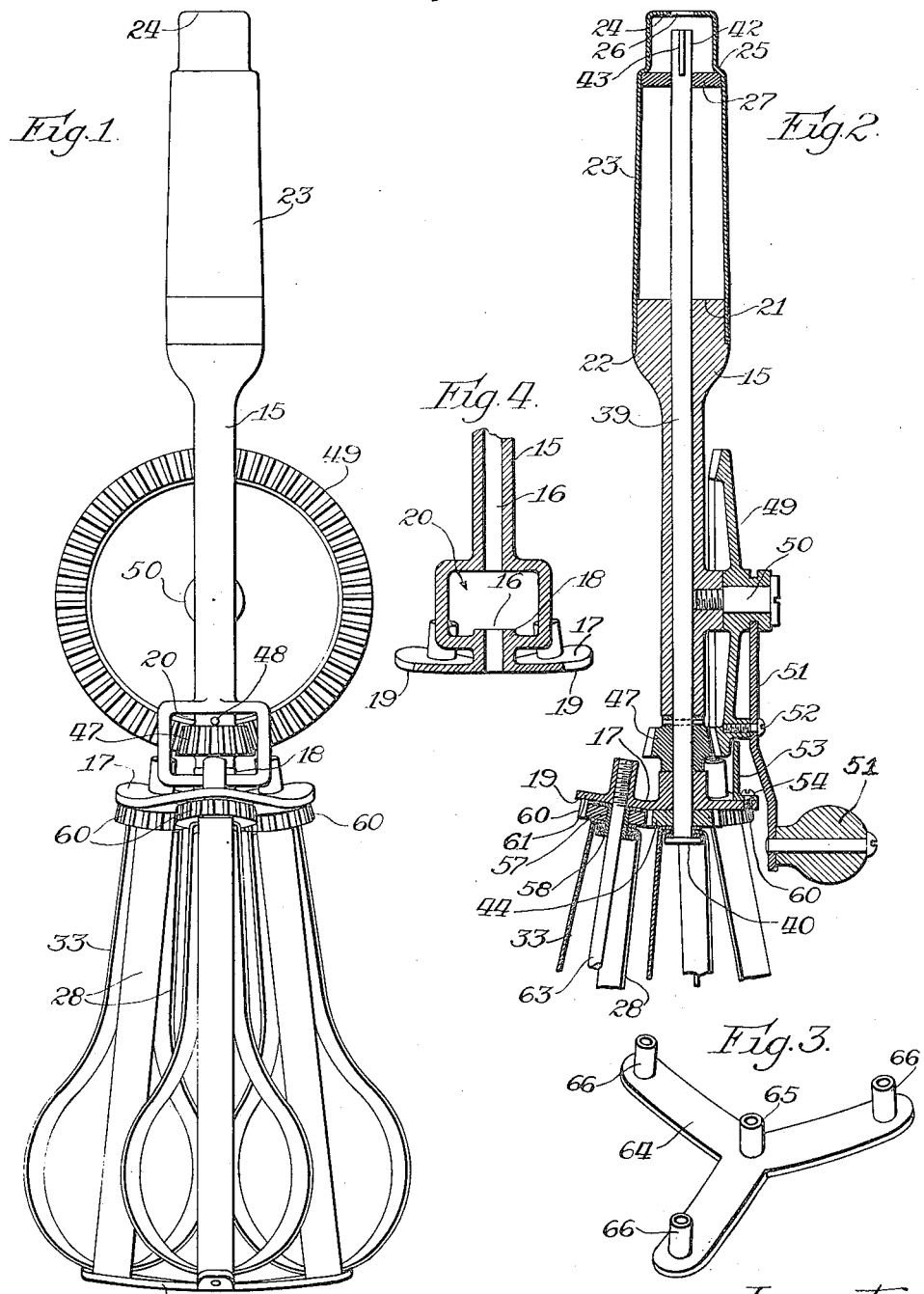

Patented Aug. 28, 1923.

1,465,940

UNITED STATES PATENT OFFICE.

PAUL HAZZARD, OF CHICAGO, ILLINOIS.

BEATER.

Application filed September 1, 1922. Serial No. 585,585.

*To all whom it may concern:*

Be it known that I, PAUL HAZZARD, a citizen of the United States, residing at Chicago, in the county of Cook and State of Illinois, have invented certain new and useful Improvements in Beaters, of which the following is a specification.

This invention relates to improvements in beaters particularly adapted, though not necessarily limited in its use, for beating or whipping eggs, cream, cake batter or the like, and one of the objects of the invention is to improve and simplify the construction thereof and at the same time provide improved means whereby the beater may be actuated by hand or may be readily converted into a power driven device.

A further object is to provide an improved construction and arrangement of the beater blades or whips, whereby the material to be beaten or whipped will be thoroughly and rapidly operated upon.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Figure 1 is a side elevation.

Figure 2 is a vertical, longitudinal sectional view of a portion of the device.

Figure 3 is a perspective view of a detail.

Figure 4 is a longitudinal sectional view of a detail of construction.

Figure 5 is a detail sectional view taken on line 5—5, Figure 6, showing the arrangement of the beater blades.

Figure 6 is a view partly in elevation and partly in section of another portion of the beater.

Figure 7 is a detail sectional view taken on line 7—7, Figure 6.

Figure 8 is a detail sectional view taken on line 8—8, Figure 6.

Figure 9 is a perspective view of a detail.

Figure 10 is a perspective view of a detail.

Figure 11 is an enlarged detail sectional view showing the manner of connecting the beater blades at one end.

Figure 12 is a plan view of a blank from which a portion of the beater blades are formed.

Figure 13 is a perspective view of another one of the beater blades.

Referring more particularly to the drawings the numeral 15 designates a handle having a longitudinal opening 16 extending therethrough and formed integral with the handle is a laterally extended base portion 17 through which the opening 16 extends. The base 17 has connected therewith a bearing 18 and the lower face of the base is provided with angularly disposed surfaces 19, each of which is provided with an opening therethrough, the longitudinal axis of which opening is inclined to the longitudinal axis of the portion of the opening 16 in the bearing 18. The handle 15 is provided with an enlarged opening 20 for a purpose to be hereinafter set forth.

The handle may be of any desired size and configuration and the upper extremity 21 thereof is reduced circumferentially to form a peripheral shoulder 22 and sleeved over the extremity 21 is a cap portion 23, the extremity of the cap abutting the shoulder 22. The cap is preferably of a tapered construction and is reduced adjacent the closed end 24 to form a shoulder 25, the end 24 being provided with an opening 26 for a purpose to be hereinafter set forth. Arranged within the cap 23 is a bearing member 27 which abuts the shoulder 25 and which shoulder is spaced from the end 24.

The beater blades are constructed of sheet material and bent into shape and as the construction of each of the body portions of the beater blades is the same, the specific description of one will apply equally as well to them all.

The body portion of these blades are cut from sheet material so as to form two integral arms or blades 28 connected together at one extremity as at 29, and these blades 28 are arranged preferably at an angle of substantially 120° with respect to each other and at the junction of these blades is formed a flat surface 30, the blades thus formed being provided with an aperture 31 adjacent the junction and apertures 32 adjacent their respective free extremities. Another arm 33 formed from sheet material has one extremity 34 bent back upon itself so as to receive the portion 29 of the arms 28, the edge 35 of the bent back portion abutting the surface 30 and the turned back end of the blade 33 is provided with alined apertures 36 adapted to be placed in register with the aperture 31, the free extremity of the arm or blade 33 being provided with an aperture 37.

When the blade 33 is connected with the blades 28 in the manner as just described and as shown in detail in Figure 11, a hollow rivet 38 is passed through the registering apertures 36—31 and then upset for the purpose of connecting the blades and also for forming a bearing at the end of the beater blade. The body of the beater element is given any desired configuration by bending the arms and the free extremities of these arms are folded so as to overlap and to cause the apertures 32 and 37 to be brought into alinement.

The upper ends of the arms of the central beater element are connected together by means of a shaft 39 which passes through the registering openings 32—37. This shaft 39 is provided with a head 40 and which head is provided with peripheral flat surfaces 41 arranged at angles to each other. Each of the surfaces 41 is of a size substantially equal to the width of the respective blades or arms 28—33 so that when the shaft 39 is passed through the registering openings 32—37 the adjacent portions of the arms or blades 28—33 will abut and rest against the adjacent portion 41 of the head 40 for connecting the shaft 39 with the beater element for rotation together.

This shaft 39 is of any desired length and extends through the bearing 18, and the opening in the handle 15 and is journaled in the bearing 27, the extremity 42 of the shaft terminating in proximity to and in alinement with the opening 26 in the end 24 of the cap 23, and is provided with a key or projection 43 by means of which the end of a flexible driven shaft may be connected with the shaft 39 in a manner well known, so as to drive the shaft 39 by means of external power such as electricity or the like.

Connected with the shaft 39 and intermediate the lower surface of the base portion 17 of the handle and the overlapping ends of the arms 28—33 is a gear 44 which may be secured in position and to the shaft 39 in any desired or suitable manner but preferably by means of a dowel pin 45 adapted to enter a recess 46 in the gear 44 when the shaft is passed through the opening in the gear.

Connected also with the shaft 39 and disposed within the enlarged open portion 20 of the base of the handle 15 is another gear 47 preferably of the bevel type, and is fastened in any suitable manner such as by means of a fastening device 48. This gear 47 meshes with a gear 49 journaled upon the handle 15 preferably by means of a removable stub shaft or bearing 50, the axis of which bearing 50 is disposed at a right angle to the axis of the shaft 39.

A handle 51 is detachably connected with the gear 49 by removably engaging the hub of the gear and also by means of a suitable fastening device 52, so that the gear 49 may be rotated by one hand when the beater is held by the handle 15 with the other hand, so as to rotate the shaft 39.

If desired a plate or member 53 may be secured by means of a fastening device 54 to the base 17 for maintaining the gear 19 against lateral displacement.

It will therefore be seen that with this improved construction the beater blade, thus far described, may be operated by hand through the medium of the handle 51 but, when it is desired, the beater blade may be driven by power by connecting with the end of the shaft 39 a flexible shaft, through the ordinary couplings, not necessary to illustrate, so as to apply external power to the shaft 39.

Encompassing the central beater designated generally by the reference numeral 55 in Figure 5 are a plurality of beaters 56, the body portions of which are similarly constructed as the body portion of the beater 55 with the exception of the method of attaching the gear to the upper end of the beater element, and as this method of attachment of the gear to each of the beater elements 56 is the same, the description of one will apply equally as well to them all.

Through the registering openings 32—37 of the arms or blades 28—33 is passed a tubular rivet 57 (see Figure 10) having a head 58 provided with angularly disposed flat peripheral surfaces 59 against which surfaces the adjacent portions of the arms or blades 28—33 rest. A gear 60 is sleeved upon the rivet 57 and the rivet is of such a length as to extend entirely through and beyond the outer surface of the gear 60, the extremity of the rivet being split as at 61 to form a plurality of fingers or ears. The upper surface of the gear 60 is provided with recesses 62 so that when the gear is sleeved upon the rivet 57 the ears or fingers 61 of the rivet are flanged down upon the surface of the gear 60 and these fingers or ears will enter the recesses 62, the latter being of a depth that the flanged down ears will stand substantially flush with the upper surface of the gear.

These gears 60 mesh with the central gear 44 carried by the central beater 55 so that when the shaft 39 is rotated all of the beater elements will be rotated, the encompassing beater elements 56 all rotating in the same direction while the central beater 55 rotates in a direction opposed to the direction of rotation of the elements 56. These beater elements are all so arranged that the arms or blades of the central element 55 will intermesh with the arms of the other beater element 56 during rotation of these elements, thereby operating upon the material in such a manner as to cause a circulation of the material entirely around the beater and in directions inwardly and outwardly during such circular flow.

The axes of rotation of the beater elements 56 are inclined to the axis of rotation of the beater element 55 and in order that the beater elements 56 may be secured in position and connected with the base 17 of the handle 15, a rod like element 63 is provided for each of the elements 56 and is threaded by one extremity into the base 17, and the longitudinal axis of the opening in the base into which the rod is threaded is disposed at an angle to the longitudinal axis of the shaft 39, the gear 60 connected with the respective elements 56 engaging and resting against the angularly disposed surface 19 on the lower face of the base 17.

This rod 63 passes through the opening in the tubular rivet 57 and is of a length to extend through the lower end of the beater.

The free ends of the rods 63 are connected by means of a base element 64 which is of any desired configuration but preferably is in the form of arms or projections arranged at an angle of substantially 120° to each other. Connected with the element 64 is a projection 65 arranged at the center thereof and a plurality of tubular projections 66 connected with the arms 64.

This member 64 is connected with the rods 63 so as to form a support and also a bearing for the lower end of the beater elements. To that end the projection 65 passes through the hollow rivet 38 in the base of the central beater element 55 and the tubular projections 66 pass through the tubular rivet 38 at the base of the arms of the beater elements 56, the projections 66 being of a length to extend for a short distance beyond the upper end of the respective rivets 38 of the beater elements 56.

The free ends of the rod like elements 63 are seated within the respective tubular projections 66 and may be secured in any desired or suitable manner. A simple and efficient means for securing the same consists in providing one or more flattened surfaces 67 on the ends of the rods 66 and then upsetting or forcing portions of the respective tubular projections 66 against such flat surfaces which will hold the rods 63 against rotation and also will hold the element 64 firmly secured in position.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A beater constituting a portable hand holding device and embodying a beater element, a shaft with which the said element is connected, a handle in which one end of the shaft is journaled, hand operating mechanism for actuating the beater element, one end of the handle having an open socket, the end of the shaft within the handle projecting into the said socket and terminating within the plane of the end of the handle, the said end of the shaft being shaped to be detachably connected with separate power mechanism for actuating the beater element.

2. A portable hand holding beater embodying a beater element, and a driving shaft for actuating said element, a handle in which the shaft is journaled, one end of the shaft terminating within the handle and being shaped to be detachably connected with power driving mechanism while the portability of the beater is not interfered with.

3. A portable hand holding beater embodying a beater element, said element embodying a shaft, a handle in which the shaft is journaled, and driving mechanism for the beater element, one end of the shaft terminating within the handle and shaped to be detachably connected with power driving mechanism while the portability of the beater is not interfered with, each of the said driving mechanisms being separate from the other.

4. A portable hand holding beater embodying a beater element, said element embodying a shaft, a handle in which the shaft is journaled, manual driving mechanism for the beater element adjacent one end of the said handle, the other end of the shaft being housed within the handle and terminating adjacent the outer end of said handle, the said housed end of the shaft being shaped to be detachably connected with power driving mechanism while the portability of the device is not interfered with.

5. A portable hand holding beater embodying a handle, a shaft, and manual driving means connected with the shaft adjacent one end of the handle grasping portion, the said shaft adjacent the other end of said grasping portion of the handle being shaped to be detachably connected with power driving mechanism while the movement of the beater ad-libitum is not interfered with.

6. A beater embodying a base member having a projecting socket, a rod like member one end of which is seated in the socket, interengaging means between the rod like member and the socket wall for securing them together, a second member spaced from the first said member and into which said second member the other end of the rod like member is threaded, a beater member rotatable about the rod like member, a gear connected with the beater member and also rotatable about said rod like member, and driving means for rotating the gear.

7. A beater embodying a base member having a projecting socket, a rod like member one end of which is seated in the socket, interengaging means between the rod like member and the socket wall for securing them together, a second member spaced from the first said member and into which said second member the other end of the rod like member is threaded, a beater member encompassing the said rod like member, one end of the said beater member being journaled upon and rotatable about the said socket, a gear connected with the other end of the beater member and rotatable about the said rod like member, and means intermeshing with the said gear for rotating it.

8. A beater element embodying a plurality of spaced blades having overlapping ends, there being registering apertures in the said ends, a headed tubular element passing through said apertures with the said head disposed in close proximity to the said ends, a gear wheel sleeved upon said element, the exposed face of the gear being provided with a plurality of recesses, the end of the said tubular element being split whereby said ends may be flanged over the face of the said gear and seated in the said recesses for securing the gear to the beater element.

9. A beater element embodying a plurality of spaced blades having overlapping ends, there being registering apertures in the said ends, a headed tubular element passing through said apertures with the said head disposed in close proximity to the said ends, the said head of the tubular element being angular in cross section to form a plurality of peripheral faces and against which faces the respective blades of the beater element rest, a gear wheel sleeved upon said element, the exposed face of the gear being provided with a plurality of recesses, the end of the said tubular element being split whereby said ends may be flanged over the face of the said gear and seated in the said recesses for securing the gear to the beater element.

10. A beater element embodying a body portion constructed of two integral blades formed of sheet material and arranged at an angle to each other, a third blade also constructed of sheet material and connected by one end with the other blades and at the junction of the latter and arranged at an angle to the other blades, all of said blades having an aperture therethrough adjacent their respective free end, the said blades being bent to cause their free ends to overlap to cause the apertures therein to register, and a fastening device passing through the said registering apertures.

11. A beater element embodying a body portion constructed of two integral blades formed of sheet material and arranged at an angle to each other, a third blade also constructed of sheet material and connected by one end with the other blades and at the junction of the latter and arranged at an angle to the other blades, all of said blades having an aperture therethrough adjacent their respective free end, the said blades being bent to cause their free ends to overlap to cause the apertures therein to register, and means for fastening said ends, the said means embodying a tubular headed element passing through said apertures from the inside of the beater element, the said head having a plurality of flat peripheral faces and against which faces the adjacent portions of the respective blades rest.

12. A beater embodying a handle member having formed integral therewith a laterally extended base having a central bearing opening therethrough and also a plurality of bearing openings therethrough spaced from and encompassing the central opening, said member having an enlarged opening transversely therethrough adjacent the said base and also having a longitudinal bearing opening in alinement with the said central opening in the said base, the longitudinal axis of said plurality of bearing openings in the base being inclined to the longitudinal axis of the said central opening, intermeshing gears journaled in the respective openings in said base, beater elements connected with the gears, a shaft connected with one of the gears and passing through the said central opening in said base and journaled in said handle, a second gear secured to the shaft and disposed within the said transverse opening in the handle, and a driving gear journaled upon the exterior of the handle and meshing with the last recited gear.

13. A handle for beaters and embodying a body portion having a longitudinal bearing opening therethrough, the upper end of the body portion being reduced circumferentially to form a peripheral shoulder, an elongated cap member sleeved over the reduced portion of the said body and abutting the said shoulder, and a bearing member arranged within the said cap and spaced from the extremity of said body portion and having a bearing opening in alinement with the first recited bearing opening, there being an opening through the end of the cap in alinement with the second said bearing opening.

14. A handle for beaters and embodying a body portion having a longitudinal bearing opening therethrough, the upper end of the body portion being reduced circumferentially to form a peripheral shoulder, an elongated cap member sleeved over the reduced portion of the said body and abutting the said shoulder, the free end of the cap being reduced in diameter to form an annular shoulder within the cap spaced from the extremity of said body, the interior of the cap being tapered in a direction away from the end of the said body, and a bearing member within the cap and abutting said shoulder and having a bearing opening in alinement with the first recited bearing, there being an opening through the end of the said cap in alinement with the opening in the said bearing member.

15. A beater embodying a beater element comprising beater blades arranged at substantially 120° to each other, a plurality of additional beater elements encompassing the first recited element, each of said additional elements comprising blades arranged at substantially 120° to each other, and means for positively driving each of the beater elements, the said additional elements rotating in the same direction and in opposition to the direction of rotation of the first recited element, the said blades of the said additional elements intermeshing with the blades of the first recited element.

In testimony whereof I have signed my name to this specification, on this 29th day of August, A. D. 1922.

PAUL HAZZARD.